United States Patent [19]

Mizukado et al.

[11] Patent Number: 4,760,237
[45] Date of Patent: Jul. 26, 1988

[54] LASER BEAM MACHINE

[75] Inventors: Masayoshi Mizukado; Minoru Tashiro, both of Kani; Yoshihiro Muto, Mino, all of Japan

[73] Assignee: Yamazaki Mazak Corporation, Niwa, Japan

[21] Appl. No.: 70,803

[22] Filed: Jul. 7, 1987

[30] Foreign Application Priority Data

Jul. 7, 1986 [JP] Japan ................................. 61-159291

[51] Int. Cl.⁴ ........................................... B23K 26/00
[52] U.S. Cl. .............................. 219/121.82; 198/468.6; 219/121.67
[58] Field of Search ................. 219/121 LY, 121 LG, 219/121 LN, 121 LC, 121 LD, 121 LH, 121 LJ; 83/435.1, 925 CC; 198/468.6, 570

[56] References Cited

U.S. PATENT DOCUMENTS

| 4,266,112 | 5/1981 | Niedermeyer | 219/121 LN |
| 4,266,456 | 5/1981 | Oostvogels | 83/435.1 X |
| 4,494,433 | 1/1985 | Gerber | 83/925 CC X |

*Primary Examiner*—C. L. Albritton
*Attorney, Agent, or Firm*—Cushman, Darby & Cushman

[57] ABSTRACT

A laser beam machine comprises stationary guide means, a first table movably mounted on the stationary guide means for moving between two positions, a movable guide means liftably disposed, and a second table movably mounted on the movable guide means for movement between the two positions. The tables are exchanged with each other by lifting the movable guide means to move the first and second tables between the two positions.

9 Claims, 4 Drawing Sheets

LASER BEAM MACHINE

BACKGROUND OF THE INVENTION

This invention relates to a laser beam machine which can efficiently machine a large number of workpieces.

Heretofore, when a large number of workpieces are to be machined by a laser beam machine, a workpiece is first placed on a table of the laser beam machine, and, in the foregoing state, the table and a torch supported above the table are appropriately moved and at the same time a laser beam is radiated to the workpiece from the front end of the torch to cut the workpiece. Then, the machined workpiece is carried out of the laser beam machine. Thereafter, another workpiece which is to be machined next is placed on the table and machined by the torch. And, the above-described procedure is repeated.

However, since machining by the torch cannot be started until a workpiece which is to be machined next is placed on the table after the machined workpiece has been removed from the table, machining efficiency is poor. Particularly, in the case a large number of workpieces are machined, since it takes much time and labor to carry out the machined small workpieces from the table, machining efficiency becomes poorer to that extent.

The present invention was accomplished in order to eliminate the above-described inconveniences.

SUMMARY OF THE INVENTION

It is therefore an object of the present invention to provide a laser beam machine which can machine a large number or workpieces consecutively so as to improve machining efficiency.

In order to achieve the above object, there is essentially provided a laser beam machine comprising stationary guide means, a first table movably mounted on the stationary guide means for moving between two positions, a movable guide means liftably disposed, a second table movably mounted on the movable guide means for movement between said two positions, and table driving means provided to the first and second tables.

According to the present invention, by lowering and lifting the movable guide means and driving adequately the table driving means after the workpiece has been machined so that the tables are immediately exchanged between two positions such as a setting-up position and a machining position. Accordingly, setting up work of the workpiece onto the table can be easily performed by using machining time, and as soon as a workpiece on one table has been machined, another workpiece which is set up on the other table can be machined. Thus, a large number of workpieces can be machined consecutively and effectively.

DETAILED DESCRIPTION OF THE PREFERRED EMBODIMENT

Figure 4:
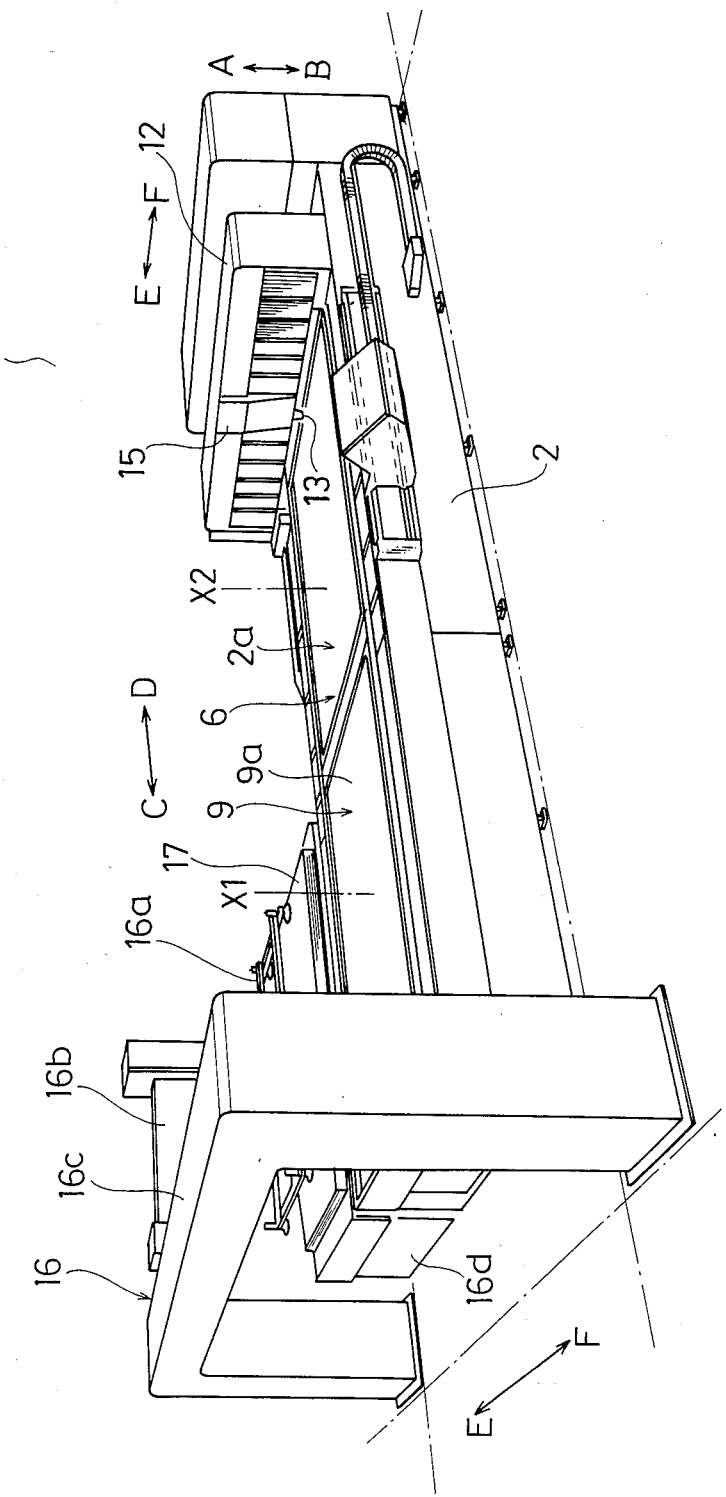
FIG. 4 is a perspective view showing one embodiment of a laser beam machine according to the present invention.

A laser beam machine 1, as shown in FIG. 4, has a frame 2. The frame 2 is formed at an upper portion in the figure with an opening portion 2a (in FIG. 4, tables 6 and 9 as will be described later are positioned in the opening portion 2a). A table 6 is movably supported on the frame 2 in the vertical directions as shown by the arrows A and B and in the horizontal direction as shown by the arrows C and D in the figure as will be described in greater detail. Similarly, another table 9 is movably supported on the frame 2 in the horizontal direction as shown by the arrows C and D in the figure as will be described in greater detail. Furthermore, a column 12 is movably provided on the right part of the frame 2 in the figure in the directions as shown by the arrows C and D. A laser beam head 15 with a torch 13 mounted on the lower end thereof in the figure is movably supported by the column 12 in the directions as shown by the arrows E and F which are perpendicular to the arrow directions C and D. Furthermore, a workpiece automatic feeder 16 is disposed at a left part of the laser beam machine 1 in FIG. 4. The workpiece automatic feeder 16 has a column 16c. A head 16b provided on the front end thereof with a workpiece holding body 16a is movably supported by the column 16c in the directions as shown by the arrows E and F. A workpiece holding table 16d is disposed under the column 16c in the figure. Plate-shaped workpieces 17 stacked up in multilayer are placed on the workpiece holding table 16d.

Figure 1:
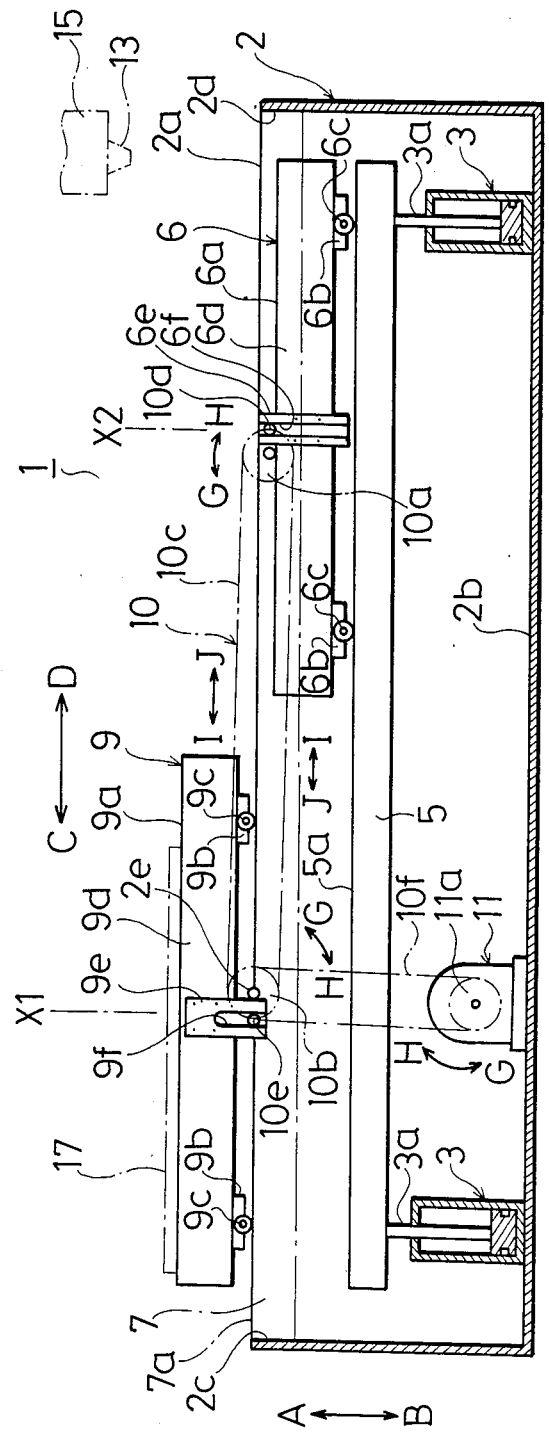
FIGS. 1 through 3 are illustrations showing table exchange operation of a laser beam machine according to the present invention.

The frame 2, as is shown in FIG. 1, is formed in a box-shape as a whole. The bottom surface 2b of the frame 2 is provided with drive cylinders 3 and 3. A rod 3a is reciprocally projectably supported by each cylinder 3 in the vertical directions as shown by the arrows A and B in the figure. Between the rods 3a and 3a, a guide rail 5 is laid. On the upper surface 5a of the guide rail 5, the table 6 is movably supported by roller 6c which is rotatably mounted on the lower end portion 6b in the figure in the directions as shown by the arrows C and D. The table 6 is formed on an upper portion thereof in the figure with a workpiece placing surface 6a. Furthermore, the table 6 is provided with an engaging plate 6e secured to the side 6d thereof. The engaging plate 6e is formed with a groove 6f in the directions as shown by the arrows A and B.

Between the left end portion 2c and the right end portion 2d of the frame 2 in the figure, a stationary guide rail 7 is disposed. On the upper surface 7a of the stationary guide rail 7, a table 9 which is formed on its upper surface with a workpiece placing surface 9a is movably supported by a roller 9c which is rotatably mounted on its lower end portion, the table 9 being movable in the directions as shown by the arrows C and D. The table 9 is provided on the side 9d thereof with an engaging plate 9e. The engaging plate 9e is formed with a groove 9f in the directions as shown by the arrows A and B.

Above the frame 2 in the figure, an engaging chain body 10 is disposed. The engaging chain body 10 has two sprockets 10a and 10b rotatably supported by the frame 2 in the directions as shown by the arrows G and H. Between the sprockets 10a and 10b, an endless chain 10c is stretched. The chain 10c is provided with two engaging pins 10d and 10e secured thereto at a predetermined space. The engaging pin 10d is slidably fitted in the groove 6f of the engaging plate 6e of the table 6, while the other engaging pin 10e is slidably fitted in the groove 9f of the engaging plate 9e of the table 9. Under the sprocket 10b in the figure, a driving apparatus 11 of a motor, etc. is disposed. A sprocket 11a is rotatably supported by the driving apparatus 11 in the directions as shown by the arrows G and H. And, between the sprocket 11a and a shaft 2e with the sprocket 10b mounted thereon, an endless chain 10f is stretched through another sprocket (not shown) mounted on the shaft 2e.

With the above-described constitution of the laser beam machine 1, in the case a workpiece 17 is required to be machined, the workpiece 17 is first placed on the workpiece placing surface 9a of the table 9 which is positioned in the setting-up position X1 shown in FIG. 4 by a workpiece automatic feeder 16. That is, the workpiece 17 on the workpiece holding table 16d is held by suction means by appropriately moving the workpiece holding body 16a in the direction B, and, in the foregoing state, the workpiece holding body 16a is lifted for a predetermined distance in the direction A together with the workpiece 17. Then, by appropriately moving the head 16b in the direction as shown by the arrow F and the workpiece holding body 16a in the direction as shown by the arrow B, the workpiece 17 is placed on the workpiece placing surface 9a of the table 9. After the workpiece 17 has been placed on the workpiece placing surface 9a, the sucking state of workpiece 17 by the workpiece holding body 16a is canceled. Thereafter, the workpiece holding body 16a is appropriately moved in the direction A and the head 16b in the direction E, so that they are returned to predetermined waiting positions. When the workpiece 17 has been placed on the workpiece placing surface 9a, the drive cylinder 3 secured to the bottom surface 2b of the frame 2 is driven as shown in FIG. 1 to retract the rod 3a in the direction as shown by the arrow B. As a result, the guide rail 5 disposed between the rods 3a and 3a is lowered in the direction B together with the rod 3a. When the guide rail 5 is lowered in the direction B, the table 6 supported by the upper surface 5a of the guide rail 5 is also lowered in the direction B and positioned in a position which is away from the machining position X2 shown in FIG. 1 by a predetermined distance downwards in the figure.

Next, in the foregoing state, the driving apparatus 11 is driven to rotate the sprocket 11a in the direction as shown by the arrow H. As a result, the sprocket 10b mounted on the shaft 2e of the engaging chain body 10 rotates in the direction H through the chain 10f. When the sprocket 10b rotates in the direction H, the chain 10c is turned in the direction as shown by the arrow J in the figure together with two engaging pins 10d and 10e which are secured to the chain 10c. When the engaging pins 10d and 10e are turned in the direction J, the table 9 with the workpiece 17 placed thereon is pushed by the engaging pin 10e which is slidably engaged in the groove 9f of the engaging plate 9e in the direction as shown by the arrow D and moved from the setting up position X1 to the machining position X2 along the upper surface 7a of the stationary guide rail 7. On the other hand, the table 6 is pushed by the engaging pin 10d which is slidably engaged in the groove 6f of the engaging plate 6e in the direction C and moved under the table 9 in the direction C from the machining position X2 towards the setting up position X1 along the upper surface 5a of the guide rail 5.

Figure 2:
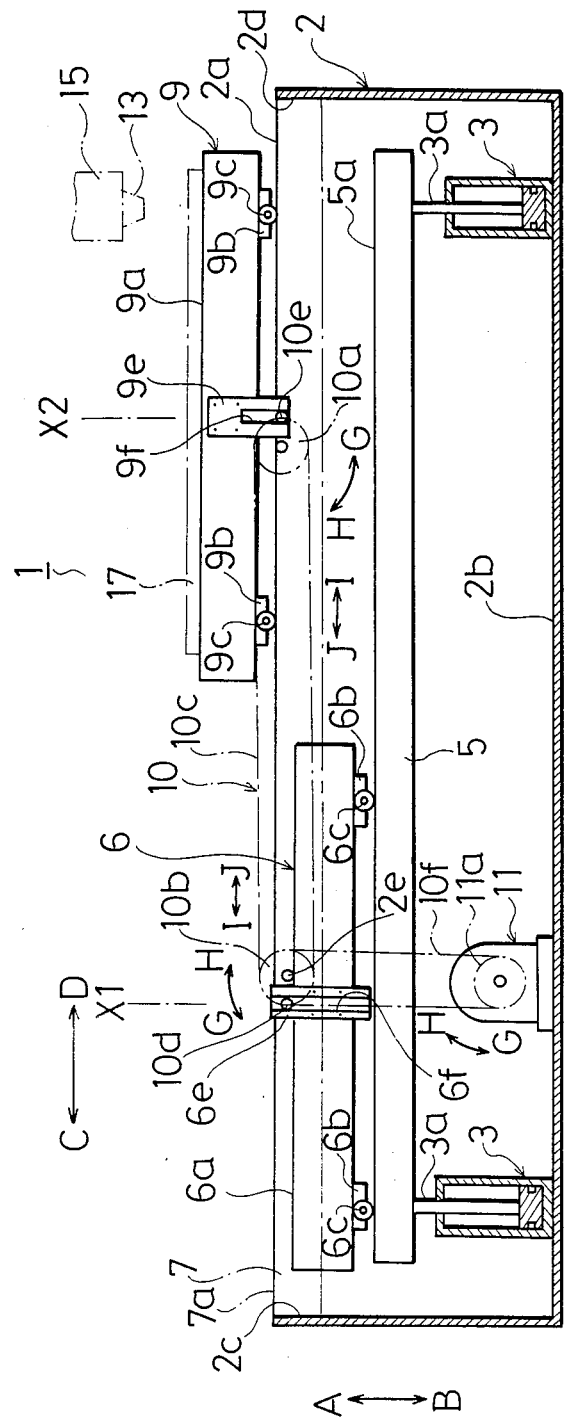

At this time, the table 6 with the workpiece placing surface 6a, etc., positioned at a lower position than the lower end portion 9b of the table 9 as shown in FIGS. 1 and 2, is moved in the direction C. Accordingly, the tables 6 and 9 are not interfered with each other and moved smoothly.

In this way, as is shown in FIG. 2, when the table 9 has been moved in the direction D and positioned in the machining position X2, and the table 6 has been moved in the direction C and positioned in a position downwardly away in the figures by a predetermined distance from the setting up position X1, the drive cylinder 3 is driven to project the rod 3a in the direction as shown by the arrow A. As a result, the guide rail 5 is lifted in the direction as shown by the arrow A together with the rod 3a, and the table 6 on the guide rail 5 is lifted in the direction A and positioned in the setting up position X1. When the table 6 has been positioned in the setting up position X1, a workpiece 17 which is to be machined next is placed on the workpiece placing surface 6a of the table 6 by the workpiece automatic feeder 16.

On the other hand, during the placing operation of the workpiece 17, another workpiece 17 on the table 9 which is positioned in the machining position X2 is machined. More specifically, the column 12 shown in FIG. 4 is appropriately moved in the directions as shown by the arrows C and D and the laser beam head with the torch 13 is appropriately moved in the directions as shown by the arrows E and F, and, at the same time, laser beam is radiated from the lower end of the torch 13 in the figure towards the workpiece 17 to cut thereof. In this way, when the workpiece 17 on the table 9 has been machined and another workpiece 17 which is to be machined next has been placed on the workpiece placing surface 6a of the table 6, the drive cylinder 3 is driven to retract the rod 3a in the direction as shown by the arrow B. As a result, the guide rail 5 is lowered in the direction as shown by the arrow B together with the rod 3a and the table 6 on the guide rail 5 with the workpiece 17 which is to be machined next placed thereon is lowered in the direction as shown by the arrow B of FIG. 2.

When the table 6 has been lowered in the direction B and positioned in a position downwardly away from the setting up position X1 by a predetermined distance, the driving apparatus 11 is driven again to rotate the sprocket 11a in the direction as shown by the arrow G. As a result, the chain 10c of the engaging chain body 10 is moved in the direction as shown by the arrow I together with the engaging pins 10d and 10e through the chain 10f, the sprocket 10b, etc. When the engaging pins 10d and 10e are moved in the direction I, the table 9 with the machined workpiece 17a placed thereon is moved in the direction C from the machining position X2 to the setting up position X1 along the upper surface 7a of the stationary guide rail 7 through the engaging plate 9e, and the table 6 with another workpiece 17 which is to be machined next is moved below the table 9 in the direction D from the setting up position X1 towards the machining position X2 along the upper surface 5a of the guide rail 5 through the engaging plate 6e.

Figure 3:
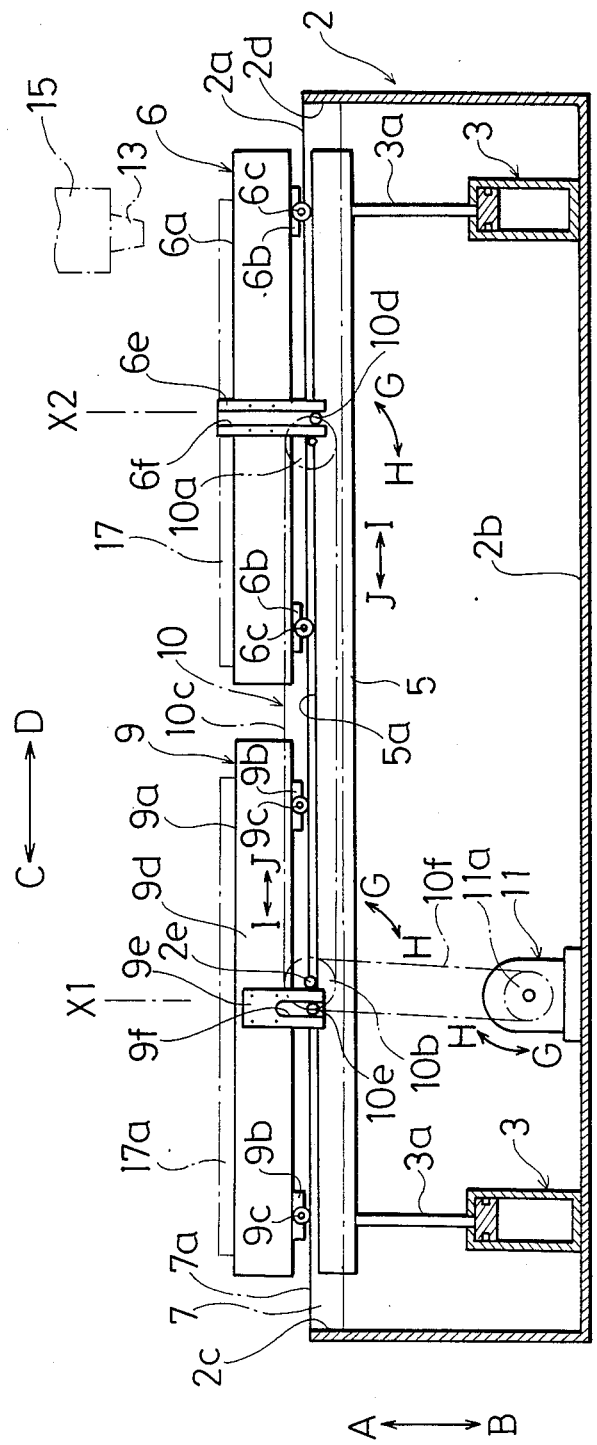

When the table 9 has been moved in the direction C and positioned in the setting up position X1, and the table 6 has been moved in the direction D and positioned in the position downwardly away from the machining position X2 by a predetermined distance, the drive cylinder 3 is driven to project the rod 3a in the direction as shown by the arrow A and move the guide rail 5 upwards in the direction A together with the table 6. In this way, as is shown in FIG. 3, when the table 6 has been lifted in the direction A and positioned in the machining position X2, the workpiece 17 on the workpiece placing surface 6a is cut by appropriately moving the column 12 in the directions as shown by the arrows C and D and the laser beam head 15 in the directions as shown by the arrows E and F, and, at the same time, radiating a laser beam from the lower end of the torch 13 in the figure.

On the other hand, during the cutting operation of the workpiece 17, the machined workpiece 17a placed on the workpiece placing surface 9a of the table 9 which is positioned in the setting up position X1 is carried out of the laser beam machine 1 by a worker, etc. When the machined workpiece 17a has been carried out, another workpiece 17 which is to be machined next is placed on the workpiece placing surface 9a by the workpiece automatic feeder 16.

In this way, a large number of workpieces 17 can be consecutively machined by repeating the table exchanging operation described.

In the above-described embodiment, the engaging chain body 10 is employed as the table driving means for the first and second tables. However, the present invention is not limited to the above. Instead, other suitable means may be employed as the table driving means as long as they can move the tables 9 and 6 between two positions such as the setting up position X1 and the machining position X2. The table driving means may of course be independently provided to each of the tables 9 and 6.

Although the present invention has been described with reference to the preferred embodiments, the embodiments described herein are for illustrative purposes only and not in limitation thereof. Also, the scope of the present invention is defined in the appended claims and will not be binded by the description of the embodiments. Accordingly, it will be understood that all changes and modifications which belong to the appended claims fall within the true spirit and scope of the present invention.

What is claimed is:

1. A laser beam machine comprising:
   stationary guide means;
   a first table movably mounted on the stationary guide means for moving between two positions;
   a movable guide means liftably disposed;
   a second table movably mounted on the movable guide means for movement between said two positions; and
   table driving means provided to the first and second tables.

2. A laser beam machine as claimed in claim 1, wherein said first and second tables are movable between two positions of a machining position and a setting up position.

3. A laser beam machine as claimed in claim 1, wherein said stationary guide means is a first guide rail horizontally disposed, and said movable guide means is a second guide rail horizontally disposed below said first guide rail.

4. A laser beam machine as claimed in claim 1, wherein said table driving means includes an engaging chain body provided between said first and second tables, and a driving apparatus for driving said engaging chain body.

5. A laser beam machine comprising:
   a frame;
   a column with a torch mounted thereon provided on said frame;
   stationary guide means;
   a first table movably provided on said stationary guide means for movement between two positions;
   movable guide means liftably provided;
   a second table movably provided on said movable guide means for movement between said two positions; and
   table driving means provided to said first and second tables.

6. A laser beam machine as claimed in claim 5, wherein said stationary guide means and movable guide means are mounted on said frame.

7. A laser beam machine as claimed in claim 5, wherein said first and second tables are movable between two positions of a machining position and a setting up position on said frame.

8. A laser beam machine as claimed in claim 5, wherein said stationary guide means is a first guide rail horizontally disposed on said frame, and said movable guide means is a second guide rail horizontally disposed below said first guide rail within said frame.

9. A laser beam machine as claimed in claim 5, wherein said table driving means includes en engaging chain body provided between said first and second tables, and a driving apparatus for driving said engaging chain body.

* * * * *